(12) United States Patent
Bieck et al.

(10) Patent No.: US 7,543,474 B2
(45) Date of Patent: Jun. 9, 2009

(54) IMPACT SENSOR SYSTEM FOR PEDESTRIAN PROTECTION

(75) Inventors: Werner Bieck, Wiltingen (DE); Christian Bour, Domprix (FR); Andreas Petereit, Schweich (DE); Markus Schreiner, Pluwig (DE)

(73) Assignee: IKE International Electronics & Engineering S.A. (LU)

( * ) Notice: Subject to any disclaimer, the term of this patent is extended or adjusted under 35 U.S.C. 154(b) by 0 days.

(21) Appl. No.: 11/911,832

(22) PCT Filed: Apr. 20, 2006

(86) PCT No.: PCT/EP2006/061701

§ 371 (c)(1),
(2), (4) Date: Oct. 18, 2007

(87) PCT Pub. No.: WO2006/111558

PCT Pub. Date: Oct. 26, 2006

(65) Prior Publication Data

US 2008/0210020 A1 Sep. 4, 2008

(30) Foreign Application Priority Data

Apr. 20, 2005 (EP) ................................. 05103202

(51) Int. Cl.
*G01N 5/00* (2006.01)
*G01N 37/00* (2006.01)
(52) U.S. Cl. ..................................... 73/11.01; 73/12.01
(58) Field of Classification Search ................ 73/11.01, 73/12.01–12.14
See application file for complete search history.

(56) References Cited

U.S. PATENT DOCUMENTS

| 6,875,938 | B2* | 4/2005 | Schmiz et al. ............... 200/310 |
| 6,958,614 | B2* | 10/2005 | Morimoto .................... 324/661 |
| 7,187,264 | B2* | 3/2007 | Bieck et al. ................... 338/47 |

(Continued)

FOREIGN PATENT DOCUMENTS

DE        22 12 190        9/1973

(Continued)

OTHER PUBLICATIONS

International Search Report; PCT/EP2006/061701; Aug. 9, 2006.

*Primary Examiner*—Max Noori
(74) *Attorney, Agent, or Firm*—Cantor Colburn LLP

(57) ABSTRACT

An impact sensor system with at least one foil-type switching element having a plurality of active areas including at least a first a second carrier foil arranged at a certain distance by at least one first spacer. The spacer has a plurality of recesses defining at least a first part of the active areas. In each active area, at least two electrode structures are arranged between the first and second carrier foils in such way that in response to a force acting on the active area, the first and second carrier foils are pressed together against the reaction force of the carrier foils and that, above a predetermined activation threshold force, an electrical contact is established between the electrode structures. The foil-type switching element is configured such that the activation threshold forces of a first group of said the active areas and a second group of active areas is different.

19 Claims, 3 Drawing Sheets

U.S. PATENT DOCUMENTS

| | | | |
|---|---|---|---|
| 7,343,807 B2* | 3/2008 | Lorenz ........................ | 73/715 |
| 2005/0011738 A1 | 1/2005 | Smith et al. | |
| 2006/0243579 A1* | 11/2006 | Bieck et al. ................. | 200/511 |

FOREIGN PATENT DOCUMENTS

| | | |
|---|---|---|
| DE | 48 08 353 | 8/1994 |
| DE | 197 18 803 | 10/1998 |
| DE | 102 30 560 | 6/2004 |
| DE | 102 56 952 | 6/2004 |
| EP | 1 464 786 | 10/2004 |
| GB | 2 225 660 | 6/1990 |

\* cited by examiner

Car / bumper parameter:
- mass $m_2 = 10^3$ kg
- velocity $v_2$
- elasticity $E_2$
- size $R_2, h_2, ...$

Impactor parameter:
- mass $m_1 = 10$ kg
- velocity $v_1$
- elasticity $E_1$
- size $R_1, h_1, ...$

IMPACT SENSOR SYSTEM FOR PEDESTRIAN PROTECTION

TECHNICAL FIELD OF THE INVENTION

The present invention generally relates to impact sensor systems for use in triggering operation of a deployable device for protecting a pedestrian hit by the front of a vehicle. The invention more specifically relates to an impact sensor system to be used for the classification of an impact in order to discriminate between impact with a pedestrian and other types of impact.

BRIEF DESCRIPTION OF RELATED ART

When a pedestrian is hit by a motor vehicle, for example a car, one type of injury can be caused by a subsequent collision between the pedestrian's head and the hood of the vehicle. In order to minimize these injuries, vehicle manufacturers have started developing safety systems for automotive vehicles, which should help to protect pedestrians in case of a car/pedestrian collision. Such safety systems comprise one or more active systems, for example hood-mounted airbags or energy-absorbing hood panels, which are designed to minimize the impact violence of the pedestrian on the vehicle structure such as the engine hood.

It is clear that an efficient control of such active systems requires reliable sensing devices, which are able to timely sense the presence of a car/pedestrian collision. The decision of whether to deploy or not to deploy must be made in a very short space of time after detecting an initial impact at the front of the vehicle.

Known impact sensors usually comprise sensing elements having at least one measurable property, which varies with a deformation or activation of the sensing element. Such sensing elements comprise e.g. optical fibre sensing elements or force sensing elements, which are mounted on the vehicle front bumper in a forward facing region of the bumper, e.g. underneath the bumper plastic or metal skin on the bumper foam core. These known impact sensors enable to detect the intensity of the deformation of the bumper or the activation of the sensor and thus may be used to determine the amplitude of the collision force acting between the object and the vehicle.

In order to reliably discriminate between an impact with a pedestrian and other types of impact, it would be furthermore desirable to sense a width of the impact zone between the object and the vehicle, i.e. the width of the contact surface between the object and the vehicle. None of the presently known sensors is able to detect the intensity of the impact and the lateral extent of the impact zone.

BRIEF SUMMARY OF THE INVENTION

The invention provides an enhanced impact sensor system.

More particularly, the invention provides an impact sensor system for pedestrian protection comprises at least one foil-type switching element having a plurality of active areas. The foil-type switching element comprises at least a first carrier foil and a second carrier foil arranged at a certain distance by means of at least one first spacer, wherein said at least one first spacer comprises a plurality of recesses defining at least a first part of said active areas. In each active area, at least two electrode structures are arranged between said first and second carrier foils in such way that in response to a force acting on the active area of the switching element, the first and second carrier foils are pressed together against the reaction force of the elastic carrier foils and that, above a predetermined activation threshold force, an electrical contact is established between the at least two electrode structures. According to the invention said foil-type switching element is configured such that the activation threshold force of a first group of said plurality of active areas is different from an activation threshold force of a second group of said plurality of active areas.

The activation threshold force of the first group of active areas being different from the activation threshold force of the second group of active areas results in the active areas of the first group having a sensitivity, which is different from the sensitivity of the active areas of the second group. It follows that the active areas from the group having the lower activation threshold force may be activated in response to an impact force acting on the impact sensor system, while the active areas of the other group of active areas are not activated because the impact force does not exceed the higher activation threshold force of the other group.

In a preferred embodiment, the foil-type switching element is configured such that the active areas form a predetermined number of groups with the active areas of one group having a specific predetermined activation threshold force, which is different from the activation threshold forces of the active areas from the other groups. The number of groups of active areas to be formed in this way is determined by the number of different interesting impact force levels to be detected. If for instance for discrimination reasons the intensity of the impact has to be classified among four different force level classes, the foil-type switching element will have four groups of active areas, and the different active areas will be dimensioned so that the activation threshold forces correspond to the boundary values of the different force level classes. The intensity of the impact i.e. the amplitude of the impact force is then detectable by means of a connected control unit by identifying the group of active areas having the highest activation threshold force, which is triggered during the impact.

In the very simple embodiment of a foil-type switching element, in which all the active areas are configured as simple switching elements, the width of the impact zone may be determined by the number of active areas of a specific group, which are activated during an impact situation, and their respective arrangement in the vehicle. In fact, in case of an impact with a very large object, the number of laterally adjacent active areas will be significantly higher than in the case of an impact with a small object. Thus the number of the activated active areas in a predetermined direction may be associated to the width of the impact zone.

It will be noted, that the activation threshold force of an active area of the foil-type switching element may be adjusted to the desired value by a number of possible measures, such as e.g. a specific design and dimensioning of the recess of the spacer and the spacer thickness, a specific dimensioning of the carrier foils in the region of the active area, a possible application of reinforcement layers on the carrier foils, a specific arrangement of the electrode structures between the carrier foils, etc.

In a preferred embodiment of the invention, at least one of said plurality of active areas is configured as a linear potentiometer. In a first variant of such a linear potentiometer, said first electrode structure comprises an elongated patch of resistive material, the opposing terminals of which are connected to different electrical potentials, said first electrode structure being arranged on said first carrier foil, and said second electrode structure comprises a conductive layer arranged in facing relationship to said first electrode structure on said second carrier foil. In an other variant of such a linear potentiometer, said first electrode structure comprises an elongated patch of resistive material and a number of conducting traces extending normally from said elongated patch of resistive material, wherein said first electrode is arranged on said first carrier foil and wherein opposing terminals of said elongated patch of resistive material are connected to different electrical potentials, said second electrode structure comprises a comb shaped electrode having a bus electrode and a number of conductive traces extending normally from said bus electrode, said second electrode structure being arranged on said first carrier foil such that said conductive traces of said first electrode structure and said conductive traces of said electrode structure are arranged in an alternating relationship, and wherein a third electrode structure comprising a shunt element is arranged on said second carrier foil in facing relationship with said conductive traces of said first and second electrode structures.

In both embodiments, the signal at the output terminal of the linear potentiometer is indicative of the location and the width of the area at which the linear potentiometer is triggered. It follows that if suitably arranged in the vehicle, these linear potentiometer configured active areas may be used to determine the location and width of the impact zone with a better spatial resolution as compared to a group of active areas configured as simple switches.

In a possible embodiment of the invention, the first group of said plurality of active areas is arranged adjacent to said second group of said plurality of active areas. The arrangement may e.g. be such that the first group of active areas and the second group of active areas are each arranged in a line along a vehicle bumper and wherein the first group of active areas is arranged above the second group of active areas. In another embodiment said first group of said plurality of active areas and said second group of said plurality of active areas are arranged adjacent to each other in an alternating relationship and regularly distributed over a sensing area of said impact sensor system e.g. in one single line.

In a further embodiment, said foil-type switching element further comprises at least one third carrier foil, said third carrier foil being arranged a certain distance from said second carrier foil by means of at least one second spacer, wherein said at least one second spacer comprises a plurality of recesses defining at least a second part of said active areas. In this case, the different active areas are arranged in different layers, so that said at least a part of said first group of said plurality of active areas is arranged e.g. on top of said second group of said plurality of active areas. In a variant of this embodiment, said second part of said active areas is configured as linear potentiometers as described above.

In yet another embodiment, each one of said plurality of active areas is configured as a linear potentiometer, said linear potentiometers being configured so as to show different activation threshold forces. It will be appreciated that both above described variants of linear potentiometers are possible.

It will be noted that the foil-type switching element is preferably arranged underneath an outer skin layer of a vehicle bumper. In a preferred embodiment, the impact sensor system comprises a plurality of foil-type switching sensors each having a plurality of active areas, said foil-type pressure sensor being arranged side by side underneath an outer skin layer of a vehicle bumper so as to extend in a lateral direction. Said plurality of foil-type switching elements may e.g. be manufactured using common carrier foils.

In order to enable a local activation to be distributed over the entire area of the switching element, the impact sensor system preferably comprises an activation layer associated to said foil-type switching element(s), said activation layer for distributing a force acting on said switching element among said plurality of active areas. Due to said activation layer a force acting locally on a part of the foil-type switching layer is relayed to the entirety of said active areas of the foil-type switching element, such that all those active areas, the activation threshold force is exceeded, are reliably activated.

BRIEF DESCRIPTION OF THE DRAWINGS

The present invention will be more apparent from the following description of several not limiting embodiments with reference to the attached drawings, wherein.

DETAILED DESCRIPTION OF THE INVENTION

The present invention relates to an impact sensor system to be integrated in a car bumper environment in order to detect specific parameters (such as impact intensity and impact zone width) relating to an impact between a vehicle and an impacting object so as to enable to classify impact phenomena. Such a sensor system measures simultaneously for a given impact object the position and the lateral distribution of effective force loads versus time. Based on the acquired data an additional algorithm allows a certain classification of the impacting object in order to identify pedestrians and to trigger dedicated safety measures.

Figure 1:
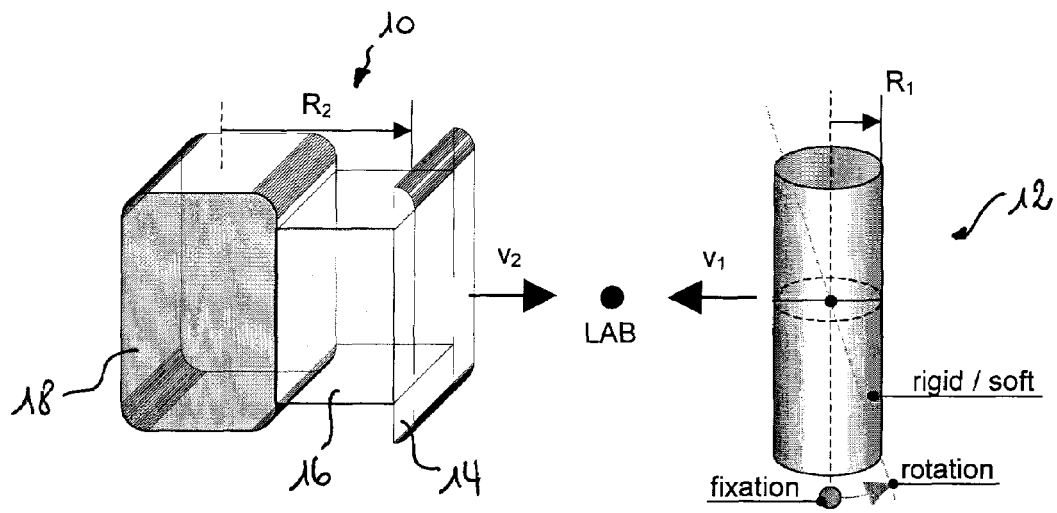
FIG. 1: schematically illustrates the parameters describing a collision between a car bumper and an impact object in the so-called laboratory system (external reference system)

The typical geometry of a car bumper 10 is depicted in FIG. 1, which schematically describes a collision process between a car and an impact object 12. The car bumper 10 consists of an elastic outer skin material 14 backed by an energy absorbing medium 16 and the rigid cross beam 18. In order to identify the impacting object 12 a force sensing system has to be integrated between bumper skin 14 and cross beam 18. The impact sensor system measures the impact location and the lateral distribution of the effective collision forces. In general, these values depend on mass, material parameters, geometrical dimensions and velocity of each collision partner.

Figure 2:
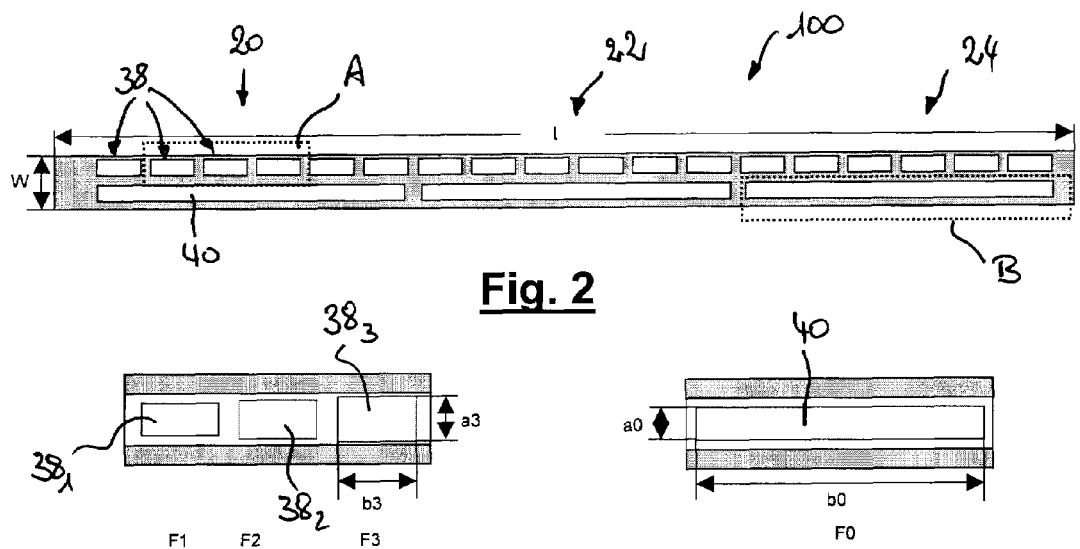
FIG. 2: shows an embodiment of an impact sensor system.

An embodiment of an impact sensor system 100 is schematically shown in FIG. 2. The shown impact sensor comprises a laminated foil stripe dimensioned to cover the complete length L of a car bumper. The laminated foil stripe includes three foil-type switching elements 20, 22 and 24, which are manufactured on common carrier foils so that in operation, the switching elements are arranged side by side along the vehicle bumper.

Figure 4:
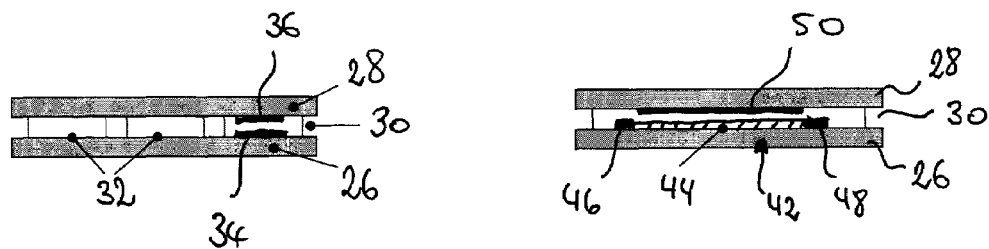
FIG. 4: shows a cross section through a group of switch-type sensor cells and of a linear potentiometer cell.

Foil-type switching elements typically comprise a first carrier foil 26 and a second carrier foil 28 arranged at a certain distance by means of a spacer 30 (see also FIG. 4). The spacer 30 comprises a plurality of recess structures of different shapes (here in rectangular geometry a, b) defining active areas 32 of the switching element. In each active area, at least two electrode structures 34 and 36 are arranged on said first and second carrier foils 26 and 28 in such way that if the carrier foils 26, 28 are pressed together an electrical contact is established between the two electrode structures 34 and 36.

Figure 3:
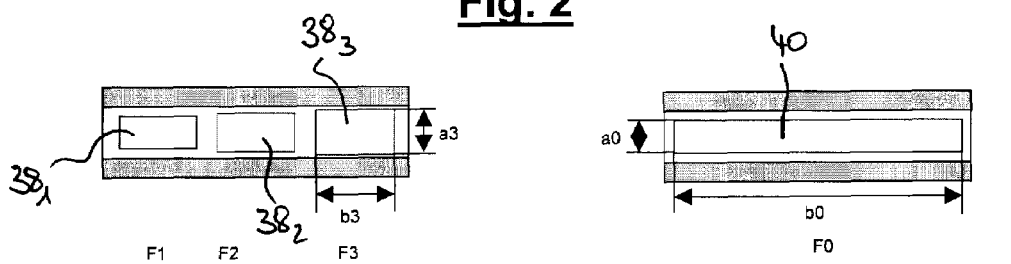
FIG. 3: shows an enlarged view of a part of the switch-type sensor cells having different sensitivities (A in FIG. 2) and of an elongated force sensitive area (B in FIG. 2)

In the impact sensor shown in FIG. 2, each switching element 20, 22 or 24 comprises a set of comparatively small switch-type sensor cells 38 of different activation sensitivity combined with an elongated force sensitive area 40 (of different sensitivity) working as linear potentiometers. The switch-type sensor cells 38 are e.g. configured as simple membrane switches with different activation threshold forces. In general, the net force necessary to establish a contact between the electrodes of the switching cell depends on the carrier foil and spacer material as well as on the geometry of the activated sensor cells. For a given material combination a well-defined activation threshold can be established locally simply by modifying the geometry of the respective activation areas. This is schematically represented in FIG. 3 by active areas $38_1$, $38_2$, $38_3$ having a different size.

The linear potentiometer cells have an elongated shape and may be configured as shown in the right part of FIG. 4. A first electrode structure 42, which is arranged on the carrier foil 28, comprises an elongated patch of resistive material 44, the opposing terminals 46 and 48 of which are connected to different electrical potentials. The second electrode structure 50 comprises a conductive layer arranged on carrier foil 26 in facing relationship to said first electrode structure 42.

In case of a localized external force load (due to an impact) both types of sensors 38 and 40 provide an electrical signal because of the mechanical contact of the carrier foils. In general, the net force necessary to establish such a contact depends on foil and spacer material as well as the geometry of the activated sensor cells. For a given material combination a well-defined activation threshold can be established locally simply by modifying the geometry of the respective activation areas.

Therefore, the local detection sensitivity of such a sensor stripe can be adjusted depending on stiffness changes over a given bumper length.

Figure 5:
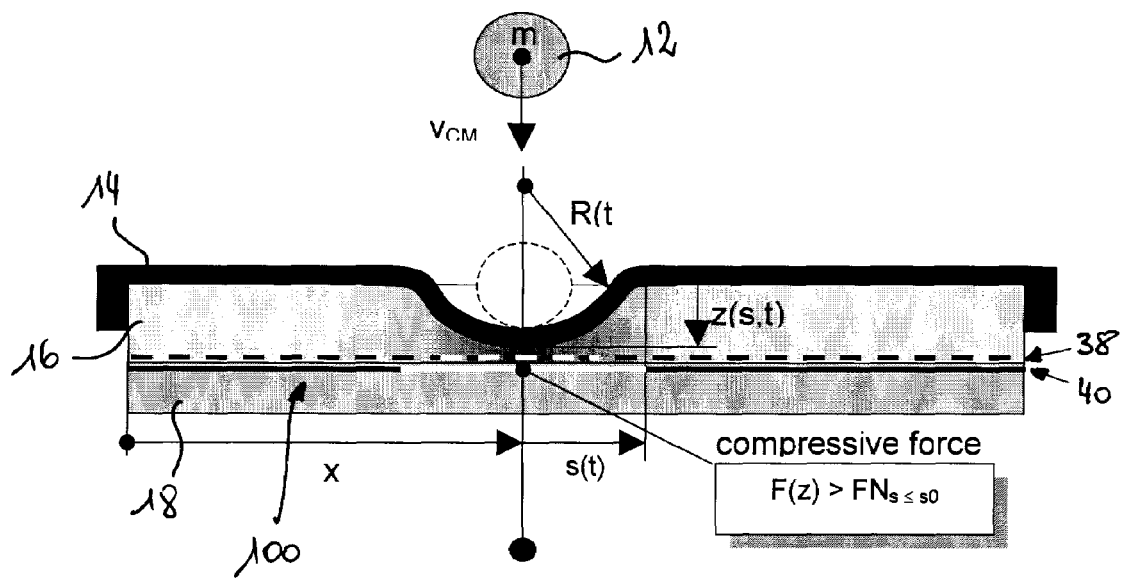
FIG. 5: schematically represents a collision event on a car bumper equipped with an impact sensor.

The sensor system provides a straightforward method for the classification of an impact object 12 during a collision with a vehicle bumper 10. By distinguishing human-like impacts (vulnerable road user) from misuse, the pedestrian protection system can be deployed properly. The detection of the impact is commonly achieved by placing the sensor system 100 in the foam-like or thermo-plastic shock-absorber 10 in the front-end of the vehicle (see FIG. 5). In the shown embodiment, the impact sensor 100 is arranged between the energy absorbing medium 16 and the rigid cross beam 18.

During the impact, the impacting object 12 deforms the outer bumper skin 14 by z(s,t) and compresses the energy absorbing medium 16 underneath. That compression depends on the lateral position s(t). Impact sensing is accomplished by one or more switch-type sensors 38 or linear potentiometer cells 40 which are activated if the compressive force F(z) applied to the system is above one or more certain threshold levels $F_N$ (N=1, ... n).

The implementation of different activation thresholds allows taking into account the velocity and mass dependency of the transferred impact momentum/energy. Furthermore, it is possible to define a certain threshold level $F_{crash}$ for crash detection (i.e. heavy mass impacts). The presence of at least one analogue sensor (linear potentiometer with activation threshold $F_0<F_N$) provides additional geometrical information about the impact. Such a linear potentiometer sensor converts changes of the force load into resistance changes. The reading of these resistance values gives an indication on the width s(t) of the impact area and on the location of that impact (mid-point of the impact). The position information provides an additional input for software based data calibration in case of local changes in bumper stiffness. In order to finally classify the impact object, an algorithm takes as input all signals versus time from all sensors described above.

It will be noted, that switch-type sensors 38 as well as potentiometers 40 can be assembled within a 3-layer laminate (substrate-spacer-substrate) defining different activation levels (at different bumper positions) by adjusting the shape of the respective activation area (as indicated in FIGS. 2 and 3). In these embodiments a first group of active areas is arranged vertically above the second group of active areas.

Figure 6:
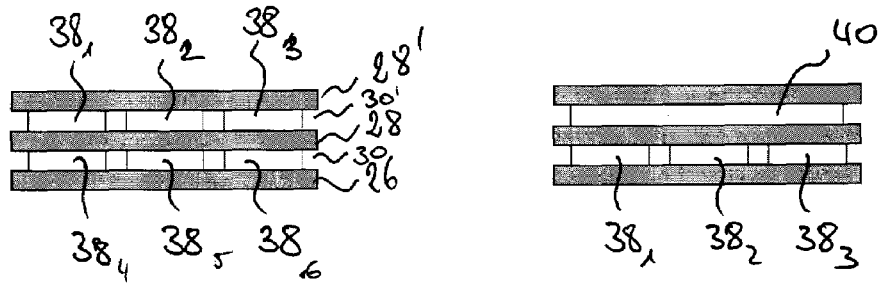
FIG. 6: shows different embodiments of an impact sensor, wherein the active areas are arranged in different layers.

Besides that, a five-layer laminate provides the additional advantage of implementing two activation thresholds at the same sensing position (double-switch/double-potentiometer-type or potentiometer-switch-type; see FIG. 6).

Figure 7:
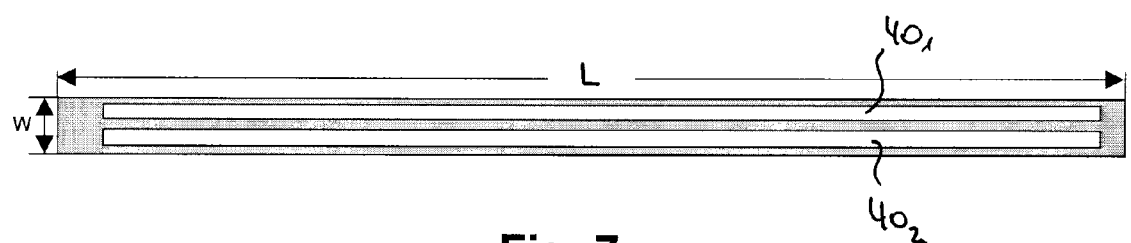
FIG. 7: shows an embodiment of an impact sensor with one foil-type switching sensor comprising two linear potentiometer cells having different activation thresholds.
Figure 8:
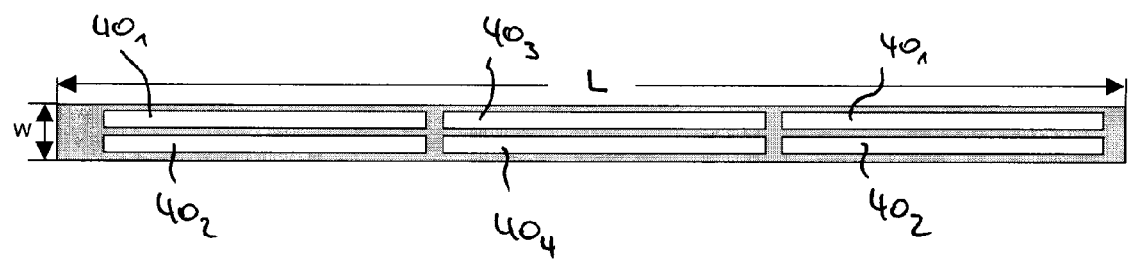
FIG. 8: shows an embodiment of an impact sensor with three foil-type switching sensors, each comprising two linear potentiometer cells having different activation thresholds.

The lateral distribution of switch-type sensor cells and potentiometers on a laminate stripe can be kept flexible. In addition to the general layout shown in FIG. 2 multiple-potentiometer structures of different activation levels can be used to measure impact location and width versus time at different collision forces. By introducing potentiometer zones more complex multiple collisions can also be detected (see FIG. 7 which shows a multiple potentiometer layout and FIG. 8, which shows a multiple-zone potentiometer layout).

It will be appreciated, that by a suitable configuration of the different switching sensor cells 38 and/or potentiometer cells 40, the local detection sensitivity of such a sensor stripe can be adjusted depending on stiffness changes over a given bumper length. For instance, the active areas, which in operation will be arranged on a lateral region of the bumper, may have a sensitivity which is specifically adapted to the higher rigidity of the bumper in the corner regions and accordingly be different form the sensitivity of corresponding active areas to be arranged in the central region of the bumper. In the embodiment of an impact sensor shown in FIG. 8, this configuration would mea that the activation threshold forces of linear potentiometer cells $40_1$ and $40_2$ are different that the activation threshold force of corresponding linear potentiometer cells $40_3$ or $40_4$ respectively.

In a further embodiment of the impact sensor, a foil-type switching element associated to a specific region of the bumper comprises at least a first plurality of linear potentiometer cells $40_1$ having a first activation threshold force, said plurality of linear potentiometer cells $40_1$ being arranged side by side along said region of the bumper. Due to the plurality of linear potentiometer cells arranged side-by-side, this impact sensor is characterized by a high spatial resolution for the detection of the impact zone, thus allowing a precise detection of the size of the impact zone and even a specific form of the contact area.

Generally, with a single linear potentiometer cell one may only determine the distance between the outermost locations, in which the linear potentiometer is activated. This means that with a single linear potentiometer cell extending along the entire region of the bumper, an impact situation showing to distant impact locations, i.e. impact of two distant legs of a person, is detected as one single large detection zone extending between the two outermost activation locations.

With a sensor, in which a plurality of linear potentiometer cells is associated to the specific bumper region, each one of the two distant impact zones will be individually detected by one or more of the plurality of linear potentiometer cells and the above described impact situation may be correctly determined. It will be noted, that in case of an impact force acting locally between two linear potentiometer cells, i.e. if the impact zone extends over more than one linear potentiometer cell, the impact zone may be determined by adding the individual surfaces activated in the different linear potentiometer cells.

The invention claimed is:

1. Impact sensor system comprising at least one foil type switching element having a plurality of active areas with predetermined activation threshold forces, at least one of said active areas being configured as a linear potentiometer, said foil-type switching element comprising at least a first carrier foil and a second carrier foil arranged at a certain distance by at least one first spacer, wherein said at least one first spacer comprises a plurality of recesses defining at least a first part of said active areas, wherein in each active area of said first part, at least two electrode structures are arranged between said first and second carrier foils in such way that in response to a force acting on the active area of the switching element, the first and second carrier foils are pressed together against the reaction force of the elastic carrier foils and that, above the predetermined activation threshold force of the active area, an electrical contact is established between the at least two electrode structures, and wherein said foil-type switching element is configured such that the activation threshold force of a first group of said plurality of active areas is different from an activation threshold force of a second group of said plurality of active areas.

2. Impact sensor system according to claim 1, wherein, in said at least one of active area that is configured as a linear potentiometer,
   said first electrode structure comprises an elongated patch of resistive material, the opposing terminals of which are connected to different electrical potentials, said first electrode structure being arranged on said first carrier foil, and
   said second electrode structure comprises a conductive layer arranged in facing relationship to said first electrode structure on said second carrier foil.

3. Impact sensor system according to claim 1, wherein, in said at least one active area that is configured as a linear potentiometer,
   said first electrode structure comprises an elongated patch of resistive material and a number of conducting traces extending normally from said elongated patch of resistive material, wherein said first electrode structure is arranged on said first carrier foil and wherein opposing terminals of said elongated patch of resistive material are connected to different electrical potentials,
   said second electrode structure comprises a comb shaped electrode having a bus electrode and a number of conductive traces extending normally from said bus electrode, said second electrode structure being arranged on said first carrier foil such that said conductive traces of said first electrode structure and said conductive traces of said electrode structure are arranged in an alternating relationship, and
   wherein a third electrode structure comprising a shunt element is arranged on said second carrier foil in facing relationship with said conductive traces of said first and second electrode structures.

4. Impact sensor system according to claim 1, wherein said first group of said plurality of active areas is arranged adjacent to said second group of said plurality of active areas.

5. Impact sensor system according to claim 1, wherein said first group of said plurality of active areas and said second group of said plurality of active areas are arranged adjacent to each other in an alternating relationship and regularly distributed over a sensing area of said impact sensor system.

6. Impact sensor system according to of claim 1, wherein said foil-type switching element further comprises at least one third carrier foil, said third carrier foil being arranged a certain distance from said second carrier foil by means of at least one second spacer, wherein said at least one second spacer comprises a plurality of recesses defining at least a second part of said active areas.

7. Impact sensor system according to claim 6, wherein said second part of said active areas is configured as a linear potentiometer.

8. Impact sensor system according to claim 1, wherein each one of said plurality of active areas is configured as a linear potentiometer.

9. Impact sensor system according to claim 1, wherein said foil-type switching element is arranged underneath an outer skin layer of a vehicle bumper.

10. Impact sensor system according to claim 1, comprising a plurality of foil-type switching sensors each having a plurality of active areas, said foil-type pressure sensor being arranged side by side underneath an outer skin layer of a vehicle bumper so as to extend in a lateral direction.

11. Impact sensor system according to claim 10 wherein said plurality of foil-type switching elements are manufactured using common carrier foils.

12. Impact sensor system according to claim 1, further comprising an activation layer associated to said foil-type switching element, said activation layer for distributing a force acting on said switching element among said plurality of active areas.

13. Impact sensor system for pedestrian protection, comprising at least one foil type switching element having a plurality of active areas with predetermined activation threshold forces, at least one of said active areas being configured as a linear potentiometer,
   said foil-type switching element comprising a first carrier foil and a second carrier foil arranged at a certain distance by at least one first spacer, wherein said at least one first spacer comprises a plurality of recesses defining at least a first part of said active areas, wherein in each active area of said first part of active areas, at least two electrode structures are arranged between said first and second carrier foils in such way that in response to a force acting on the active area of the switching element, the first and second carrier foils are pressed together against the reaction force of the elastic carrier foils and that, above the predetermined activation threshold force of the active area, an electrical contact is established between the at least two electrode structures;
   said foil-type switching element comprising a third carrier foil arranged at a certain distance from said second carrier foil by at least one second spacer, wherein said at least one second spacer comprises a plurality of recesses defining at least a second part of said active areas, wherein in each active area of said second part of active areas, at least two electrode structures are arranged between said second and third carrier foils in such way that in response to a force acting on the active area of the switching element, the second and third carrier foils are pressed together against the reaction force of the elastic carrier foils and that, above the predetermined activation threshold force of the active area, an electrical contact is established between the at least two electrode structures;
   and wherein said foil-type switching element is configured such that the activation threshold force of a first group of said plurality of active areas is different from an activation threshold force of a second group of said plurality of active areas.

14. Impact sensor system according to claim 13, wherein said at least one active area that is configured as a linear potentiometer is of said second part of active areas.

15. Impact sensor system according to claim 14, wherein, in said at least one of active area that is configured as a linear potentiometer,
- said first electrode structure comprises an elongated patch of resistive material, the opposing terminals of which are connected to different electrical potentials, said first electrode structure being arranged on one of said second and third carrier foils, and
- said second electrode structure comprises a conductive layer arranged in facing relationship to said first electrode structure on the other of said second and third carrier foils.

16. Impact sensor system according to claim 14, wherein, in said at least one active area that is configured as a linear potentiometer,
- said first electrode structure comprises an elongated patch of resistive material and a number of conducting traces extending normally from said elongated patch of resistive material, wherein said first electrode structure is arranged on one of said second and third carrier foils and wherein opposing terminals of said elongated patch of resistive material are connected to different electrical potentials,
- said second electrode structure comprises a comb shaped electrode having a bus electrode and a number of conductive traces extending normally from said bus electrode, said second electrode structure being arranged on the same carrier foil as said first electrode structure in such a way that said conductive traces of said first electrode structure and said conductive traces of said electrode structure are arranged in an alternating relationship, and
- wherein a third electrode structure comprising a shunt element is arranged on the other one of said second and third carrier foils in facing relationship with said conductive traces of said first and second electrode structures.

17. Impact sensor system according to claim 13, wherein said foil-type switching element is arranged underneath an outer skin layer of a vehicle bumper.

18. Impact sensor system according to claim 13, comprising a plurality of foil-type switching sensors each having a plurality of active areas, said foil-type pressure sensor being arranged side by side underneath an outer skin layer of a vehicle bumper so as to extend in a lateral direction.

19. Impact sensor system according to claim 13, further comprising an activation layer associated to said foil-type switching element, said activation layer for distributing a force acting on said switching element among said plurality of active areas.

* * * * *

UNITED STATES PATENT AND TRADEMARK OFFICE
CERTIFICATE OF CORRECTION

PATENT NO. : 7,543,474 B2
APPLICATION NO. : 11/911832
DATED : June 9, 2009
INVENTOR(S) : Werner Bieck et al.

It is certified that error appears in the above-identified patent and that said Letters Patent is hereby corrected as shown below:

ON THE TITLE PAGE

Item (73) Assignee:

Delete "IKE International Electronics & Engineering S.A." and insert therefor --IEE International Electronics & Engineering S.A.--.

Signed and Sealed this

Tenth Day of November, 2009

David J. Kappos
*Director of the United States Patent and Trademark Office*